Aug. 17, 1965   A. WILLIAMS   3,201,159
VEHICLE WHEEL TRACTION MEANS
Filed Jan. 28, 1964   2 Sheets-Sheet 1
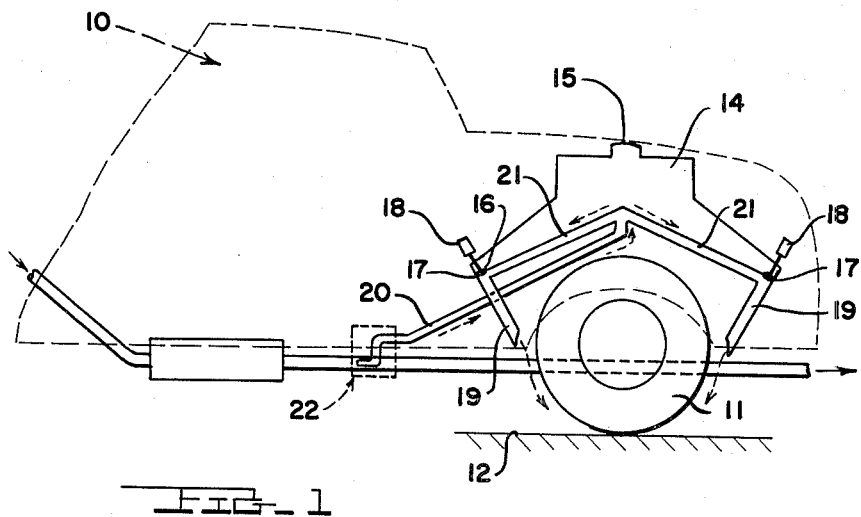
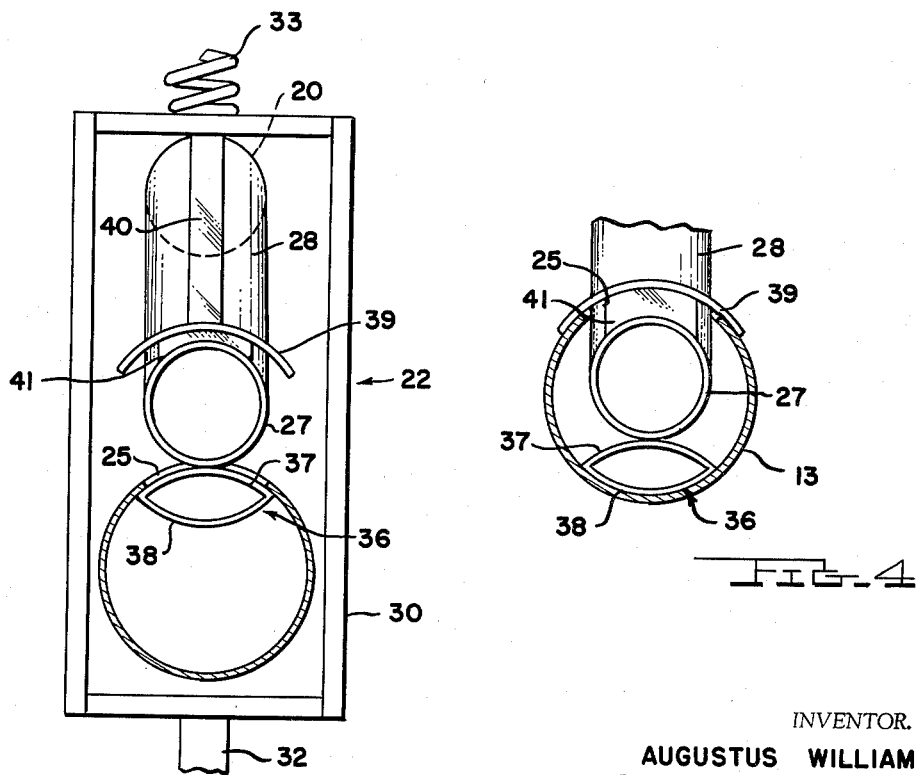
INVENTOR.
AUGUSTUS WILLIAMS
BY
Cullen, Sloman & Cantor
ATTORNEYS Aug. 17, 1965  A. WILLIAMS  3,201,159
VEHICLE WHEEL TRACTION MEANS
Filed Jan. 28, 1964  2 Sheets-Sheet 2

INVENTOR.
AUGUSTUS WILLIAMS
BY
Cullen, Sloman & Cantor
ATTORNEYS

United States Patent Office 3,201,159
Patented Aug. 17, 1965

3,201,159
VEHICLE WHEEL TRACTION MEANS
Augustus Williams, Detroit, Mich., assignor of fifty percent to Earl Safford, Detroit, Mich.
Filed Jan. 28, 1964, Ser. No. 340,680
2 Claims. (Cl. 291—3)

This invention relates to a vehicle wheel traction means and more particularly to a means for applying a gritty, sand-like material to the area of a vehicle tire for supplying additional traction when needed.

It has been conventional to apply sand or a sand-like material in the vicinity of a vehicle wheel at times when the road surface is slippery in order to increase traction. In the case of automobiles, this has traditionally been accomplished by manually applying the sand. While mechanical devices have been proposed in the past, these have uniformly been of limited value because of their various inherent limitations.

Hence, it is an object of this invention to provide an automatic means for blowing sand or a grity sand-like material on and in the vicinity of an automobile and the like wheel or tire, using as the blowing or propulsion means, all or a portion of the normal exhaust gases of the vehilce.

A further object of this invention is to provide a means for tapping or diverting automobile exhaust gases and for conveying these gases to a supply of a grity material for blowing the material on and around the vehicle tire for providing additional traction.

These and other objects and advantages of this invention may become apparent upon reading the following description of which the attached drawings form a part.

In these drawings:

FIG. 1 is a schematic elevational view of the rear portion of an automobile showing the means for applying gritty material to the vehicle wheel.

FIG. 3 is an end view taken in the direction of arrows 3—3 of FIG. 2, and

FIG. 4 is a fragmentary view, similar to FIG. 3, showing the diverter valve in a lower position.

Figure 2:
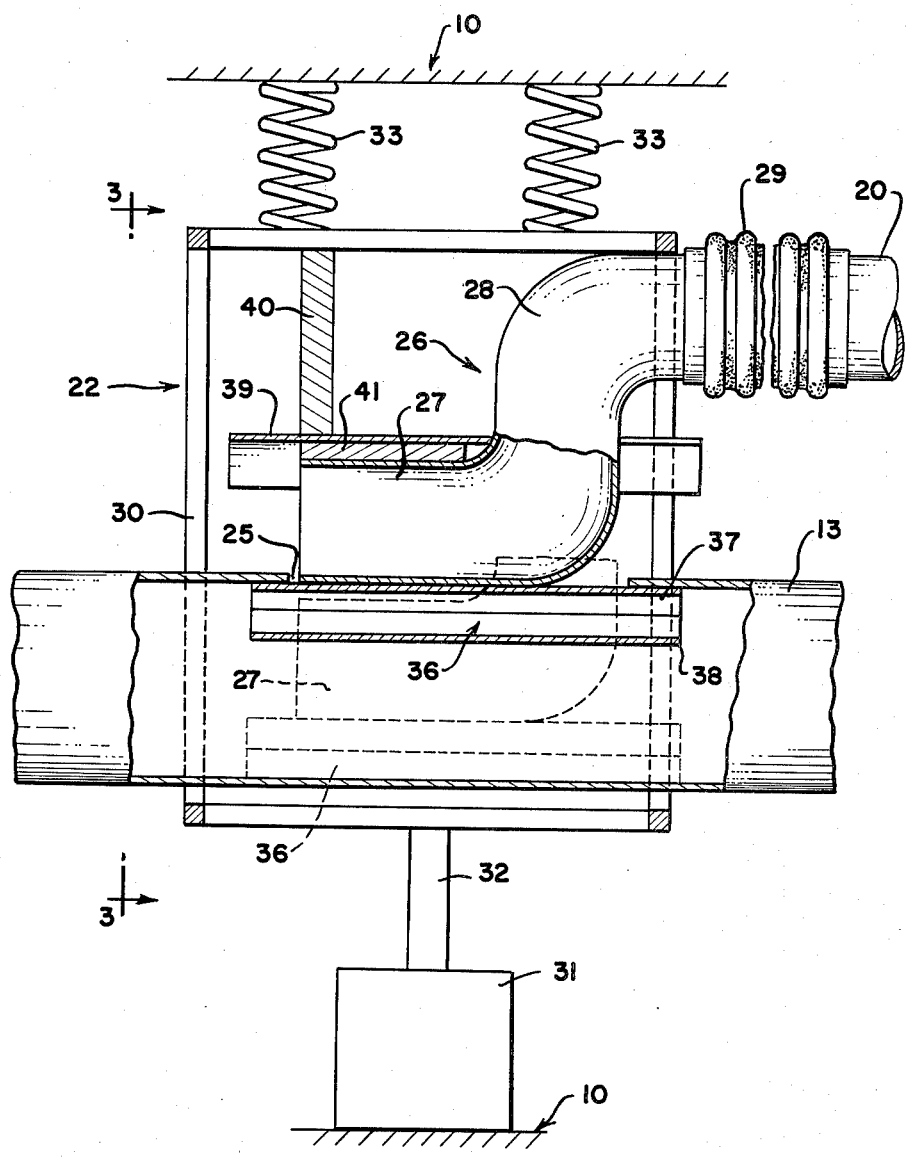
FIG. 2 is an enlarged elevational view of the diverter valve means for diverting exhaust gases from the automobile tail pipe.

With reference to FIG. 1, a vehicle, such as an automobile 10, is schematically illustrated. The vehicle has a rear wheel including a tire 11 rested upon the road surface 12. In addition, a conventional tail pipe 13 is schematically illustrated, the tail pipe normally conveying exhaust gases received from the engine and passed through the muffler for exhausting same at the rear of the vehicle.

Built into the rear of the vehicle, such as within the rear fender is a storage container 14 having a refill opening 15 which may be closed by a suitable cap, for containing a sandy-grity material loosely stored therein. The container is provided with one or two openings 16 for discharge of the gritty material through a closure or gate 17 which normally blocks the opening 16. The plug shaped gates are connected to the ends of the movable rods of conventional solenoids 18 which move the gates downwardly upon energization to permit the sandy material to gravity flow downwardly through openings 17 and thus through nozzles 19 upon and in the vicinity of the vehicle wheel 11. As illustrated, two nozzles 19 may be provided or alternatively, only one nozzle may be used at the front portion of the vehicle wheel.

To convey and blow the gritty material through the nozzle and upon the vehicle wheel, the conventional automobile exhaust gases are used as the propellant and these are conveyed through a conduit 20 to passageways 21 which open into the nozzles 19 just below their gates 17.

The opposite end of the conduit is connected to a diverter valve 22. The diverter valve is adapted to divert exhaust gases from the tail pipe 13 into the conduit 20.

Referring to FIGS. 2 and 3, it can be seen that the tail pipe is provided with an elongated opening 25, located between the ends of the tail pipe. Above the opening is located a valve pipe 26, forming a part of the diverter valve 22 and having a lower intake section 27 arranged axially parallel and above the tail pipe and having an integral upwardly and outwardly bent section 28 which is connected by a flexible tube connector 29 to the end of the conduit 20. A frame or yoke 30 is arranged around the tail pipe and has its lower end connected to the movable solenoid rod 32 of a conventional solenoid 31 which in turn is connected to a portion of the automobile body. The upper end of the frame 30 is connected by tension springs 33 to a portion of the automobile body, so that the frame moves downwardly in response to actuation of the solenoid (see dotted line position of intake section 21) and moves upwardly under the pull of springs 33.

The opening 25 in the tail pipe is normally sealed closed by means of a lower sealing means 36 formed of a downwardly curved plate 37 which presses upwardly against the tail pipe portions defining the opening 25. The sealing means is also provided with an upwardly curved plate 38 joined at its edges to the plate 37 for resting upon the lower surface of the tail pipe when the intake section of the valve pipe is lowered. The seal means may be transversely blocked for blocking flow of the exhaust gases through it, or alternatively it may be left unblocked, as illustrated, where only a portion of the exhaust gases are to be diverted.

Located above the intake section 27 is a downwardly curved plate 39 forming an upper sealing plate for sealing against the outside of tail pipe 13 when the intake section is lowered. The upper sealing plate is connected by a strip 40 to the frame 30 and by a suitable connector block 41 to the upper portion of the valve pipe intake section 27.

In normal operation, the valve pipe 26 is arranged in the position shown in FIGS. 2 and 3 with the openings in the tail pipe sealed by the lower sealing means 36. Here, the vehicle exhaust gases normally pass through the tail pipe for discharge at the rear of the vehicle. When it is desired to apply the gritty material in the vicinity of the automobile wheel to increase traction, solenoids 31 and 18 are actuated, these being connected to the vehicle battery (not shown) and an actuating switch by usual electrical connections, to thus pull the frame 30 downwardly against the force of springs 33 to locate the intake section 27 of the valve pipe 26 within the tail pipe 13 while sealing the opening in the tail pipe 13 with the upper sealing plate 39. The conduit 20, which is rigid, remains connected to the upwardly bent section 28 of the valve pipe because of the flexing of the flexible connector 29. Simultaneously, the gates 17 are opened by means of the action of the solenoids 18 and the sandy or gritty material is free to begin gravity flowing through the openings 16 in the storage container.

At this point, exhaust gases are directed through the intake pipe 27 and through the conduit 20 to the passageways 21 below the storage container to blow downwardly through the nozzles 19, thereby carrying and blowing the sandy or gritty material upon and in the vicinity of the vehicle wheel 11, thereby increasing traction.

It can be seen, that the driver of the vehicle, by merely energizing the solenoids, which can be accomplished by a simple, conventional switch located near the steering wheel and connecting the solenoids to the battery, can selectively blow gritty material in the vicinity of this vehicle wheel when the vehicle is stuck on a slippery surface or when additional traction is needed during skidding upon slippery surfaces.

Upon de-energization of the solenoids, the gates 17 are closed to shut off flow of the gritty material from the storage container and in addition, the frame 30 moves upwardly under the influence of springs 33, back to its FIG. 2 position, thus returning the flow of exhaust gases to its normal, tailpipe discharge condition.

FIG. 4 illustrates the operational position of the valve pipe, with the intake section located within the tail pipe for diverting a portion of the exhaust gases. If desired, flanges may be provided (not shown) around the intake section 27 for further blocking flow of exhaust gases and thereby diverting more of these exhaust gases through the valve pipe 26.

This invention may be further developed within the scope of the following claims. Accordingly, it is desired that the foregoing description be read as being merely illustrative of an operative embodiment of this invention and not in a strictly limited sense.

I now claim:

1. A vehicle wheel traction means for an automotive vehicle having wheels and an engine exhaust gas pipe, and having a storage container for containing a quantity of sand-like material, with the container having a discharge nozzle opening into the area of a vehicle wheel, comprising, valve means for selectively diverting engine exhaust gases from said exhaust pipe to said nozzle for blowing said material through and out of said nozzle; said valve means including a short intake pipe normally arranged parallel and closely adjacent to said exhaust pipe, and an elongated opening formed in the exhaust pipe at the intake pipe and being of a size to receive the full length of the intake pipe; the intake pipe being movable in a radial direction into and out of the exhaust pipe; an inner elongated transversely curved plate fitted within said exhaust pipe and normally sealing off the entire opening from inside said exhaust pipe, said inner plate being secured to the intake pipe along the side portion of the intake pipe which is adjacent to the exhaust pipe; an outer elongated transversely curved plate arranged on and secured to the side of the intake pipe remote from the exhaust pipe opening and being of a size to contact against the exhaust pipe when the intake pipe is arranged within the exhaust pipe to thereby seal off the entire opening from outside the exhaust pipe; one end of said intake pipe opening in a direction to receive normal flow of exhaust gases when the intake pipe is arranged within the exhaust pipe, and the opposite end of the intake pipe having an integral extension portion bent approximately radially outwardly, that is, extending away from the exhaust pipe; and a conduit having an end formed as a flexible hose portion connected to said extension and an opposite end connected to said nozzle for conducting exhaust gases to said nozzle; and means for selectively moving the intake pipe into and out of said exhaust pipe.

2. A construction as defined in claim 1 and said means for selectively moving the intake pipe, including an electrically operated solenoid secured to said intake pipe and arranged to move the intake pipe towards and into the exhaust pipe when electrically actuated.

References Cited by the Examiner

UNITED STATES PATENTS

| 1,850,795 | 3/32 | Hoffman | 291—3 |
| 1,963,532 | 6/34 | Sheldon | 291—3 |
| 1,975,346 | 10/34 | Borchek et al. | 291—3 |
| 2,185,234 | 1/40 | Sudbury | 291—3 |
| 2,244,069 | 6/41 | Kook et al. | 291—3 |
| 2,606,780 | 8/52 | Loftus et al. | 291—3 |

ARTHUR L. LA POINT, *Primary Examiner.*

EUGENE G. BOTZ, *Examiner.*